US010885171B2

(12) United States Patent
Mohammad et al.

(10) Patent No.: US 10,885,171 B2
(45) Date of Patent: Jan. 5, 2021

(54) AUTHENTICATION VERIFICATION USING SOFT BIOMETRIC TRAITS

(71) Applicant: Advanced New Technologies Co., Ltd., George Town (KY)

(72) Inventors: Ahmad Saeed Mohammad, Baghdad (IQ); Duc Huy Hoang Nguyen, Kansas City, MO (US); Ajita Rattani, Kansas City, MO (US); Raghunath Sai Puttagunta, Roeland park, KS (US); Zhu Li, Overland Park, KS (US); Reza R. Derakhshani, Shawnee, KS (US)

(73) Assignee: Advanced New Technologies Co., Ltd., Grand Cayman (KY)

( * ) Notice: Subject to any disclaimer, the term of this patent is extended or adjusted under 35 U.S.C. 154(b) by 53 days.

(21) Appl. No.: 16/361,038

(22) Filed: Mar. 21, 2019

(65) Prior Publication Data

US 2020/0302039 A1  Sep. 24, 2020

(51) Int. Cl.
*G06F 21/32* (2013.01)
*G06K 9/00* (2006.01)

(52) U.S. Cl.
CPC ......... *G06F 21/32* (2013.01); *G06K 9/00288* (2013.01); *G06K 9/00892* (2013.01)

(58) Field of Classification Search
CPC . G06F 21/32; G06K 9/00288; G06K 9/00892
(Continued)

(56) References Cited

U.S. PATENT DOCUMENTS

| 6,557,994 B1 * | 5/2003 | Rose | G02C 3/003 351/111 |
| 8,734,296 B1 * | 5/2014 | Brumback | A61B 5/1118 482/8 |

(Continued)

FOREIGN PATENT DOCUMENTS

| CN | 209542998 | * 10/2019 | G02C 11/02 |
| DE | 102005017966 | * 10/2006 | G02C 3/003 |

(Continued)

OTHER PUBLICATIONS

Mohammad et al., "Eyebrows and Eyeglasses as soft biometrics using deep learning," IET Biometrics, Nov. 2019, 8(6):378-390.
(Continued)

*Primary Examiner* — Jerome Grant, II
(74) *Attorney, Agent, or Firm* — Fish & Richardson P.C.

(57) ABSTRACT

The technology described in this document can be embodied in a method for verifying an authenticated state of a device. In one aspect, the method includes capturing, during a primary authentication process, first auxiliary user identifying information for short-term authentication verification of the subject. The first auxiliary user identifying information includes first eyebrow biometric information for the subject and first eyeglass frame information for the subject. A short-term authentication verification process is performed to verify identify of the subject. In response to determining that a match score that indicates a degree of match between the first auxiliary user identifying information and captured second auxiliary user identifying information meets or exceeds a predetermined threshold, an authenticated state for the subject is verified. In response to determining that the match score does not meet or exceed the predetermined threshold, the authenticated state for the subject is ended.

20 Claims, 15 Drawing Sheets

(58) Field of Classification Search
USPC .......................................................... 382/115
See application file for complete search history.

(56) References Cited

U.S. PATENT DOCUMENTS

| | | | | |
|---|---|---|---|---|
| 10,445,938 B1* | 10/2019 | Poliakov | ............... | G06T 19/006 |
| 2005/0229007 A1* | 10/2005 | Bolle | ...................... | G06K 9/00 |
| | | | | 713/186 |
| 2013/0227651 A1* | 8/2013 | Schultz | .............. | H04L 63/0861 |
| | | | | 726/4 |
| 2014/0230033 A1* | 8/2014 | Duncan | .................. | G06F 21/32 |
| | | | | 726/7 |
| 2014/0318571 A1* | 10/2014 | Rajkovich | ............. | A45D 44/12 |
| | | | | 132/319 |
| 2015/0071508 A1* | 3/2015 | Boshra | ................. | G06F 3/0488 |
| | | | | 382/124 |
| 2016/0057139 A1* | 2/2016 | McDonough | .......... | H04L 67/02 |
| | | | | 726/6 |
| 2016/0105285 A1* | 4/2016 | Jakobsson | ............. | H04L 9/3231 |
| | | | | 713/186 |
| 2016/0149905 A1* | 5/2016 | Wang | ...................... | H04L 12/06 |
| | | | | 455/41.2 |
| 2016/0154991 A1* | 6/2016 | Berini | ................. | G06F 21/6245 |
| | | | | 382/116 |
| 2016/0203306 A1* | 7/2016 | Boshra | ..................... | G07C 9/37 |
| | | | | 726/19 |
| 2016/0239686 A1* | 8/2016 | Kwon | .................. | G06F 21/606 |
| 2017/0124392 A1* | 5/2017 | Gu | ....................... | G06K 9/2036 |
| 2017/0372052 A1* | 12/2017 | Kwok-Suzuki | ......... | G06F 21/32 |
| 2017/0374065 A1* | 12/2017 | Shtraym | ............. | G06K 9/6202 |
| 2018/0268458 A1* | 9/2018 | Popa | .................. | G06K 9/00288 |
| 2018/0288040 A1* | 10/2018 | Kursun | ............... | H04L 63/0861 |
| 2018/0365492 A1* | 12/2018 | Ortiz | ..................... | G02B 27/017 |
| 2019/0019024 A1* | 1/2019 | Zhou | ....................... | G06F 21/83 |
| 2019/0123907 A1* | 4/2019 | Kim | ........................ | H04L 9/302 |
| 2019/0213312 A1* | 7/2019 | Tussy | ................. | G06K 9/00899 |
| 2019/0268158 A1* | 8/2019 | Lentini | ............. | G06K 9/00597 |
| 2019/0321340 A1* | 10/2019 | Gumaste | .............. | A61K 9/0053 |
| 2020/0042968 A1* | 2/2020 | Jayaram | ............. | G06Q 20/3276 |

FOREIGN PATENT DOCUMENTS

| | | | | |
|---|---|---|---|---|
| KR | 102038551 | * | 11/2019 | ............ G06F 21/32 |
| TW | 256954 | * | 2/2005 | ............ G02C 11/00 |
| WO | WO2018154341 | * | 8/2018 | ............... G06K 9/00 |

OTHER PUBLICATIONS

PCT International Search Report and Written Opinion in International Application No. PCT/US2020/016547, dated Jun. 16, 2020, 14 pages.

Mohammad [online] et al., "Comparison of Squeezed Convolutional Neural Network Models for Eyeglasses Detection in Mobile Environment," Research Gate, May 2018, [retrieved on Jul. 22, 2019], retrieved from: URL<https://www.researchgate.net/publication/331311313>, 10 pages.

Mohammad [online] et al., "Short-term User Authentication Using Eyebrows Biometric for Smartphone Devices," Research Gate, Sep. 2018, [retrieved on Jul. 22, 2019], retrieved from: URL<https://www.researchgate.net/publication/330094175>,7 pages.

* cited by examiner

AUTHENTICATION VERIFICATION USING SOFT BIOMETRIC TRAITS

TECHNICAL FIELD

This disclosure relates to image capture devices.

BACKGROUND

Biometrics allows a person to be identified and authenticated based on a set of recognizable and verifiable data, which are unique and specific to them. Biometric authentication includes the process of comparing data for a person's characteristics to that person's biometric "template" to determine resemblance. Biometric authentication systems can be grouped based on the physical characteristic employed to authenticate users. Examples of such systems include authentication based on fingerprints, hand geometry, palm veins, retina scans, iris scans, facial recognition, signatures, and voice analysis.

SUMMARY

In one aspect, this document features a method for allowing continued access to a secure system based on soft biometrics. The method includes: capturing, during a primary authentication process in which primary user identifying information is obtained for a subject using a device, first auxiliary user identifying information for short-term authentication verification of the subject, wherein the first auxiliary user identifying information comprises first eyebrow biometric information for the subject and first eyeglass frame information for the subject; and determining, after the primary authentication process, to perform a short-term authentication verification process to verify identify of the subject; performing the short-term authentication verification process, including: capturing second auxiliary user identifying information for the subject, including second eyebrow biometric information for the subject and second eyeglass frame information for the subject; comparing the first auxiliary user identifying information to the second auxiliary user identifying information including determining a match score that indicates a degree of match between the first auxiliary user identifying information and the second auxiliary user identifying information; determining whether the match score meets or exceeds a predetermined threshold score; in response to determining that the match score meets or exceeds the predetermined threshold score, verifying an authenticated state for the subject in which continued use of the device is allowed; and in response to determining that the match score does not meet or exceed the predetermined threshold score, end the authenticated state for the subject including disabling use of the device by the subject.

In another aspect, this document features a system that includes an image acquisition device and an image analysis engine that includes one or more processors. The image acquisition device is configured to: capture, during a primary authentication process in which primary user identifying information is obtained for a subject using a device, first auxiliary user identifying information for short-term authentication verification of the subject, wherein the first auxiliary user identifying information comprises first eyebrow biometric information for the subject and first eyeglass frame information for the subject; determine, after the primary authentication process, to perform a short-term authentication verification process to verify identify of the subject; perform the short-term authentication verification process, including: capturing second auxiliary user identifying information for the subject, including second eyebrow biometric information for the subject and second eyeglass frame information for the subject; comparing the first auxiliary user identifying information to the second auxiliary user identifying information including determining a match score that indicates a degree of match between the first auxiliary user identifying information and the second auxiliary user identifying information; determining whether the match score meets or exceeds a predetermined threshold score; in response to determining that the match score meets or exceeds the predetermined threshold score, verifying an authenticated state for the subject in which continued use of the device is allowed; and in response to determining that the match score does not meet or exceed the predetermined threshold score, end the authenticated state for the subject including disabling use of the device by the subject.

In another aspect, this document features one or more machine-readable storage devices that includes machine-readable instructions configured to cause one or more processing devices to execute various operations. The operations include: capturing, during a primary authentication process in which primary user identifying information is obtained for a subject using a device, first auxiliary user identifying information for short-term authentication verification of the subject, wherein the first auxiliary user identifying information comprises first eyebrow biometric information for the subject and first eyeglass frame information for the subject; and determining, after the primary authentication process, to perform a short-term authentication verification process to verify identify of the subject; performing the short-term authentication verification process, including: capturing second auxiliary user identifying information for the subject, including second eyebrow biometric information for the subject and second eyeglass frame information for the subject; comparing the first auxiliary user identifying information to the second auxiliary user identifying information including determining a match score that indicates a degree of match between the first auxiliary user identifying information and the second auxiliary user identifying information; determining whether the match score meets or exceeds a predetermined threshold score; in response to determining that the match score meets or exceeds the predetermined threshold score, verifying an authenticated state for the subject in which continued use of the device is allowed; and in response to determining that the match score does not meet or exceed the predetermined threshold score, ending the authenticated state for the subject including disabling use of the device by the subject.

Implementations of the above aspects can include one or more of the following features. In response to determining that the match score does not meet or exceed the predetermined threshold score, the primary authentication process can be re-performed. Determining to perform the short-term authentication verification process can include determining that a predetermined amount of time has occurred since completion of the primary authentication process. The short-term authentication verification process can be repeated at multiple subsequent time points. The device can be a kiosk device or a mobile device. The first auxiliary user identifying information and the second auxiliary user identifying information can be obtained using a front-facing camera of the mobile device. The first auxiliary user identifying information can include first clothing characteristics of the subject, the second auxiliary user identifying information can include second clothing characteristics of the subject, and comparing the first auxiliary user identifying information to the second auxiliary user identifying information can include comparing the first clothing characteristics to the second clothing characteristics. The match score can include a fusion score of two or more of an eyebrow match score, an eyeglasses frame match score, and a clothing characteristic match score. The short-term authentication verification process can be performed without prompting the subject for user input Various implementations described herein may provide one or more of the following advantages. Reliability and/or security of a biometric authentication system can be improved by verifying a prior authentication of a user. By allowing a biometric authentication system to verify a prior authentication using soft biometrics, additional processing can be preemptively terminated, thereby creating an additional layer of security. A user can be verified and a user's authentication state maintained, if the user returns to a previously (biometrically or otherwise) authorized device after a short period of time, without needing extra explicit biometric scans, for an improved user experience. In some cases, the technology described herein allows for increasing system security while reducing requirements for additional hardware. This in turn, in some cases, can reduce costs associated with the underlying biometric authentication system.

One major issue associated with implementation of biometrics with behavioral features is a complication of user compliance, which can lead to significant reduction in usability and overall user experience. A desirable optimal biometric for mobile devices can be one that distinguishes among the largest possible population with a least invasive, least expensive, and highest accuracy methodology. Passive methods of identification can therefore have a huge benefit over interactive methods due to transparency, ease of integration, and independence from user compliance. Accordingly, passive authentication verification based on soft biometrics can improve security of a system. During typical use of a mobile device, a user's face and some of the user's upper body can be seen in the field of view of the camera, adding an option to identify the user or verify a prior authentication by facial and/or other soft biometric patterns. Images can provide a wealth of data related to user identity and behavior and use thereof can be transparent to the user experience.

The technology described herein improves security/reliability of biometric authentication systems that rely on recognizing a user based on face recognition, eye-print recognition, iris recognition etc. Specifically, this document describes processing steps that allow for determining whether a current user in a session is the same user who was previously authenticated at the start of the session. Upon detecting that the current user is not the same as the previously-authenticated user, further access to the system by the current user without an explicit authentication of the current user can be prevented, thereby adding an added layer of security to the system.

Figure 1:
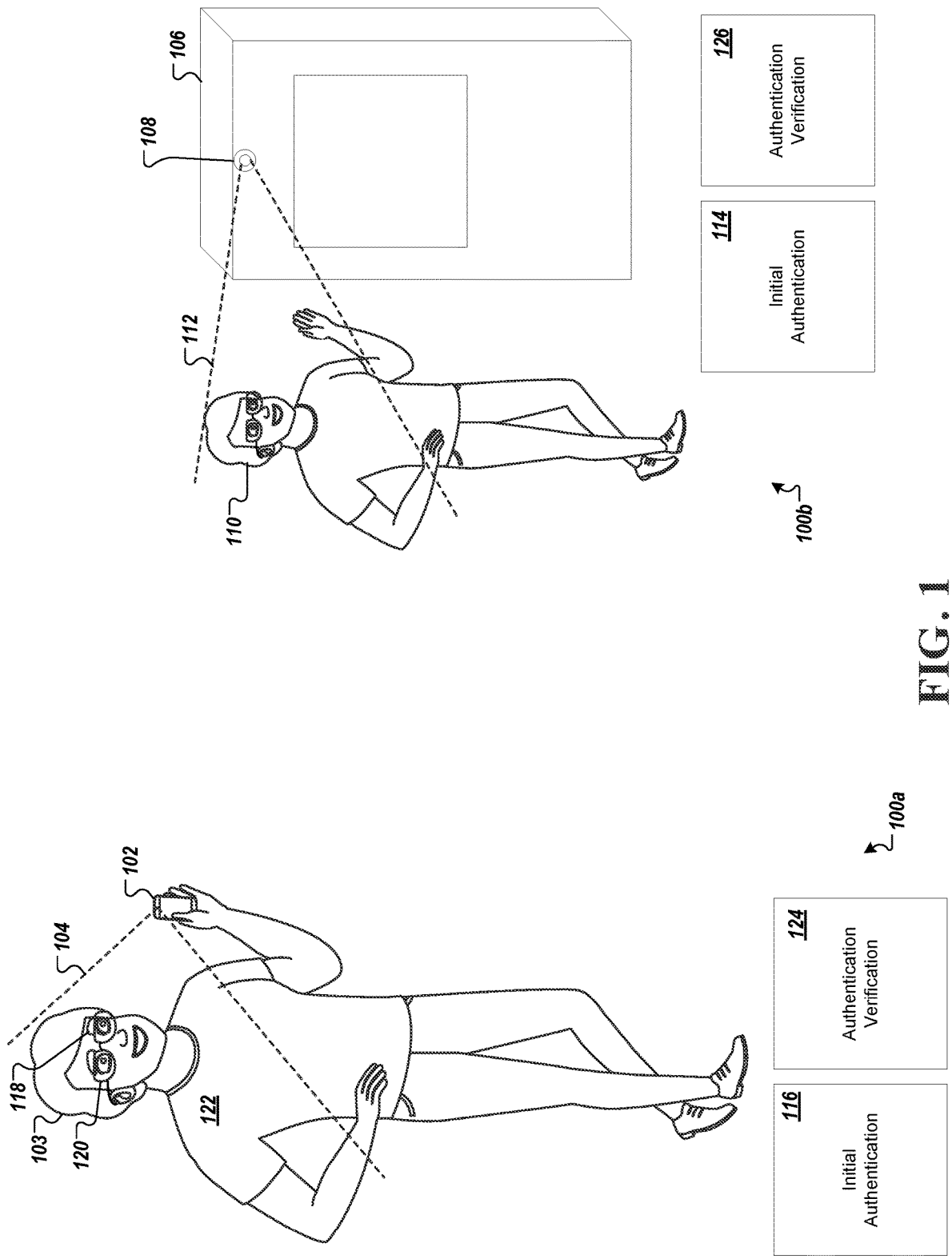
FIG. 1 illustrates example environments in which the technology described herein may be used.

Repeat use of reference characters in the present specification and drawings is intended to represent same or analogous features or elements.

DETAILED DESCRIPTION

This document presents an image analysis method in which images captured using an image acquisition device of a biometric authentication system are analyzed to verify a prior authentication of a user.

Some desktop and mobile applications in need of secure access may be configured to authenticate users at an initial login stage where the user enters an authenticated state. Many biometric authentication systems involve authenticating a user to a secure system based on a primary authentication that may include recognizing the user's face, eye-print, iris etc. Such biometric authentication systems may involve capturing one or more video or images of a user, and executing corresponding recognition processes on the captured image.

Malicious attempts to breach the security of such biometric authentication systems can include use of a system by a malicious user after an authentic user has logged on to a system. For instance, if a user becomes distracted and steps away from a device, another user may assume control of the device, possibly gaining access to sensitive information without being properly authenticated. The malicious user can use the device and pose as the authentic user while a session of the authentic user is still active.

Accordingly, persistence or a continuation of the authenticated state during user interaction may be desirable, particularly for sensitive applications. For such applications, it may be desirable to have a continuous (e.g., repeated) authentication system in place after an initial log-in stage, for authentication verification.

An authentication system can verify authentication of a user using soft biometric traits. Soft biometric traits (e.g., gender, skin color, face shape, typing and swiping behavior, etc.) are physical or behavioral characteristics that can provide information about individuals. Some soft biometric traits may be, in isolation, insufficient to uniquely define a user's identity. However, using soft biometrics for verification of a previous authentication can provide various advantages. For instance, soft biometrics may be collected more easily, with less user intrusion and compliance, than other biometrics. Multiple soft biometric traits can be fused together, in combination, to overcome singular uniqueness. As another example, one or more soft biometrics can be used along with one or more other biometric traits to improve both security and robustness of the other biometric trait(s). In an example system, clothing, eyebrow, and eyeglasses characteristics, as seen within a field of view of a camera (e.g., a front-facing camera) of a device, can be used as soft biometric traits for an authentication of a user subsequent to a primary authentication. Clothing and eyeglasses, although not physically part of the human body, can contain visual information which can be used for short-term authentication.

FIG. 1 illustrates example environments 100a and 100b in which the technology described herein may be used. The technology described herein may be used, for example, with various types of devices, such as a mobile device 102. The mobile device 102 can include, for example, a front-facing camera. A face and upper torso of a user 103 can be in a field of view 104 the front-facing camera, while the user 103 is using the mobile device 102.

A kiosk 106 can be another example environment in which the technology described herein may be used. The kiosk 106 may be used for various purposes that require authenticating users via one or more biometric authentication processes. For example, the kiosk 106 can include an automated teller machine (ATM) that allows a user to withdraw money from a bank account. In general, the kiosk 106 may be deployed at various types of locations to authenticate users interactively, or even without any active participation of the user.

The kiosk 106 can include a camera 108 that is configured to capture images of users interacting with the kiosk 106, such as a user 110, who is within a field of view 112 of the camera 108. The captured images may be processed to identify/authenticate valid users, and/or permit or deny access to the services/products being offered through the kiosk 106. As described below, a captured image can be used to verify a prior authentication of user, based on soft biometric traits.

The user 110 can take part in an initial, primary authentication process 114 before using the kiosk 106. For example, the primary authentication process 114 may include recognizing the user's face, eye-print, iris etc. As another example, the user 110 can provide a user identifier and credentials. Similarly, the user 103 can take part in a primary authentication process 116 before using a particular application on the mobile device 102.

During the primary authentication process 114 or 116, initial auxiliary user identifying information, or soft biometrics, can be captured for the user 110 or the user 103, respectively. Auxiliary biometrics can be information about a user that can be used for short term identification of the user. For instance, auxiliary biometrics can include a shape of an eyebrow 118, a shape of glasses frames 120, or an appearance of clothing 122. Auxiliary, or soft biometrics can be user traits that are unlikely to change within a predetermined amount of time (e.g., five minutes) after the primary authentication process 114 or 116 has been completed. Initial auxiliary biometrics that are captured when a user is first authenticated can be compared to later, subsequently-captured auxiliary biometrics, to determine whether a user attempting to access a respective device is a same user as the authenticated user.

For instance, short-term authentication verification processes 124 or 126 can be performed after the user 103 or the user 110 have been authenticated, respectively. For instance, the short-term authentication verification processes 124 and 126 can be performed on a periodic basis (e.g., every minute). In the short-term authentication verification processes 124 and 126, current auxiliary biometrics can be captured for the user 103 or the user 110, respectively. For instance, current eyebrow, eyeglass frame, and clothing characteristics can be captured. The short-term authentication verification processes 124 and 126 can include comparing respective initial auxiliary biometrics to respective current auxiliary biometrics. For instance, a match score can be computed for a respective device which indicates a degree of match between initial auxiliary biometrics and current auxiliary biometrics captured on the device.

In response to determining that a match score meets or exceeds a predetermined threshold score, an authenticated state for a user can be verified. For instance, a match score computed on the mobile device 102 may be more than the predetermined threshold score, and execution of the short-term authentication verification process 124 on the mobile device 102 can result in allowance of continued use of the mobile device 102 by the user 103.

As another example, in response to determining that a match score does not meet or exceed the predetermined threshold score, an authenticated state for a user can be ended. For instance, a match score computed for the kiosk 106 may be less than the predetermined threshold score, and execution of the short-term authentication verification process 126 can result in a locking of the kiosk 106. The user 110 may have walked away from the kiosk 106, for example, and the camera 108 may have captured an image of another, currently unauthorized user, with the short-term authentication verification process 126 determining that the other user is not the same as the user 110. The kiosk 106 can remain locked, for example, until a next successful completion of the primary authentication process 114.

Figure 2:
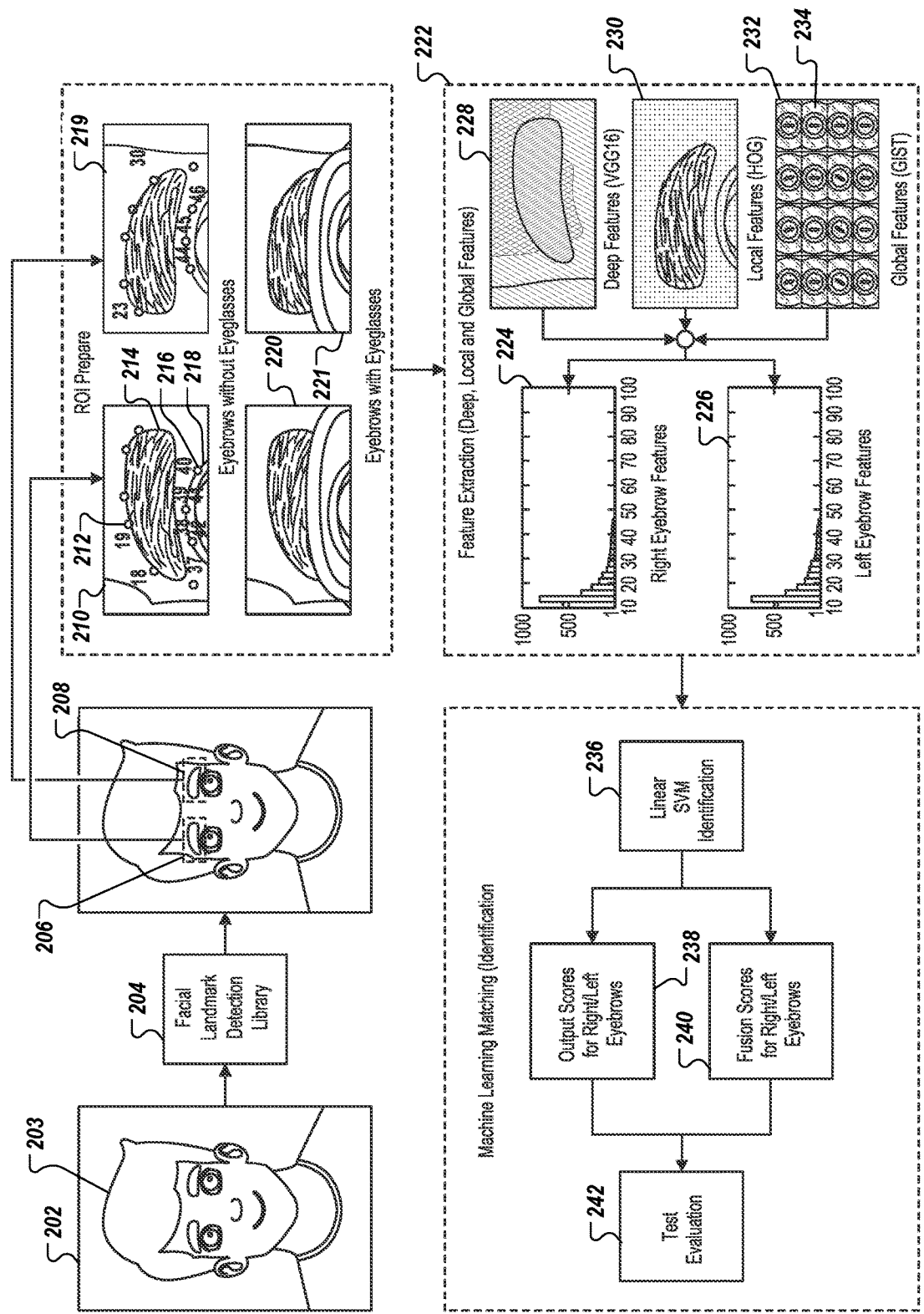
FIG. 2 illustrates an example of a system for using eyebrows as a soft biometric for short-term authentication.

FIG. 2 illustrates an example of a system 200 for using eyebrows as a soft biometric for short-term authentication. An image 202 of a user 203 is obtained, e.g., using an image capture device. For instance, the image 202 can be obtained using a front-facing camera of a mobile device, a camera included in or otherwise associated with a kiosk device, etc. The image 202 can be an image of the user 203 that is obtained during or as part of an initial authentication process or as part of a short-term re-authentication process.

The image 202 can be processed using a facial landmark detection library 204 to obtain facial coordinates of landmarks in a right eyebrow region of interest (ROI) 206 (e.g., corresponding to a right eyebrow of the user 203) and in a left eyebrow ROI 208. The image 202 can be processed, for example, using an image processing library that can include features for machine learning and data analysis, particularly for facial landmark detection.

An annotated right eyebrow ROI 210 corresponding to the right eyebrow ROI 206 illustrates identified coordinates of facial landmarks identified in the right eyebrow ROI 206. Each coordinate can have an identifier. For instance, a coordinate 212 with an identifier of "19" designates a particular position on a right eyebrow 214 in the annotated right eyebrow ROI 210. As another example, a coordinate 216 with an identifier of "40" designates a particular position on the top of a right eye 218 in the annotated right eyebrow ROI 210. Similar coordinates can be identified and plotted in an annotated left eyebrow ROI 219. If the user 203 is wearing glasses, ROIs can include eyebrows along with glasses, as illustrated by a right eyebrow ROI 220 and a left eyebrow ROI 221. Although not shown, the right eyebrow ROI 220 and the left eyebrow ROI 221 can be annotated with identified coordinates, as for the annotated right eyebrow ROI 210 and the annotated left eyebrow ROI 219.

In a feature extraction phase 222, right eyebrow features 224 and left eyebrow features 246 are extracted, based on previously determined facial coordinates. For instance, both the right eyebrow features 224 and the left eyebrow features 226 can include deep features 228, local features 230, and global features 232.

The deep features 228 can be extracted using a VGG (Visual Geometry Group) Convolutional Neural Network (CNN), as described in more detail below with respect to FIG. 3. The CNN can learn, in later (e.g., deeper) layers, features, such as image edge and contour detectors from earlier layers. The "deeper" layers can respond and create their own feature filters for more complicated patterns in an input, such as textures, shapes or variations of earlier-processed features.

The local features 230 can be extracted using a histogram of oriented gradients (HOG). A HOG technique can include counting occurrences of gradient orientation in localized portions of an image. The global features 232 can be extracted using a "gist" descriptor.

A gist descriptor can be obtained by dividing a feature map into a 4-by-4 grid (e.g., including sixteen grid cells, for example, a grid cell 234), for which orientation histograms are extracted. As another example, feature values within each grid cell can be averaged. Multiple feature maps can be obtained by convolving an input image at different scales and orientations. A gist descriptor can be formed by concatenating averaged values of the multiple feature maps. A gist descriptor can summarize gradient information (e.g., scales and orientations) for different parts of an image, providing a rough description (e.g., the gist) of a scene embodied in the image.

The global features 232 can describe an image as a whole to generalize an entire image, whereas the local features 230 can describe image patches (e.g., key points in the image). The global features 232 can include contour representations, shape descriptors, and texture features, for example. The local features 230 can represent the texture in an image patch.

A linear SVM (Support Vector Machine) classifier 236 can create output scores 238 for left and right brows, based on the right eyebrow features 224 and the left eyebrow features 226, respectively. Additionally, fusion scores 240 for both left and right eye brows can be determined, based on the output scores 238 for left and right eyebrows, respectively. The fusion scores 240 can be determined by consolidating multiple output scores 238.

In a test evaluation phase 242, output scores 238 and fusion scores 240 (or, in some implementations, just the fusion scores 240) for a first image 202 are compared to corresponding scores for a second image 202. For instance, the first image may be an image of the user 203 obtained during an initial (or primary) authentication process and the second image may be an image of the user 203 obtained at a later point in time, e.g., during a short-term re-authentication process. In the test evaluation phase 242, a match score can be determined that indicates a likelihood that the first image and the second image are images of a same user (e.g., the user 203). If the match score meets or exceeds a predetermined threshold score, the user 203 may be granted continued use of a device or system. If the match score does not meet or exceed the predetermined threshold score, access to the device or system may be denied for the user.

Figure 3:
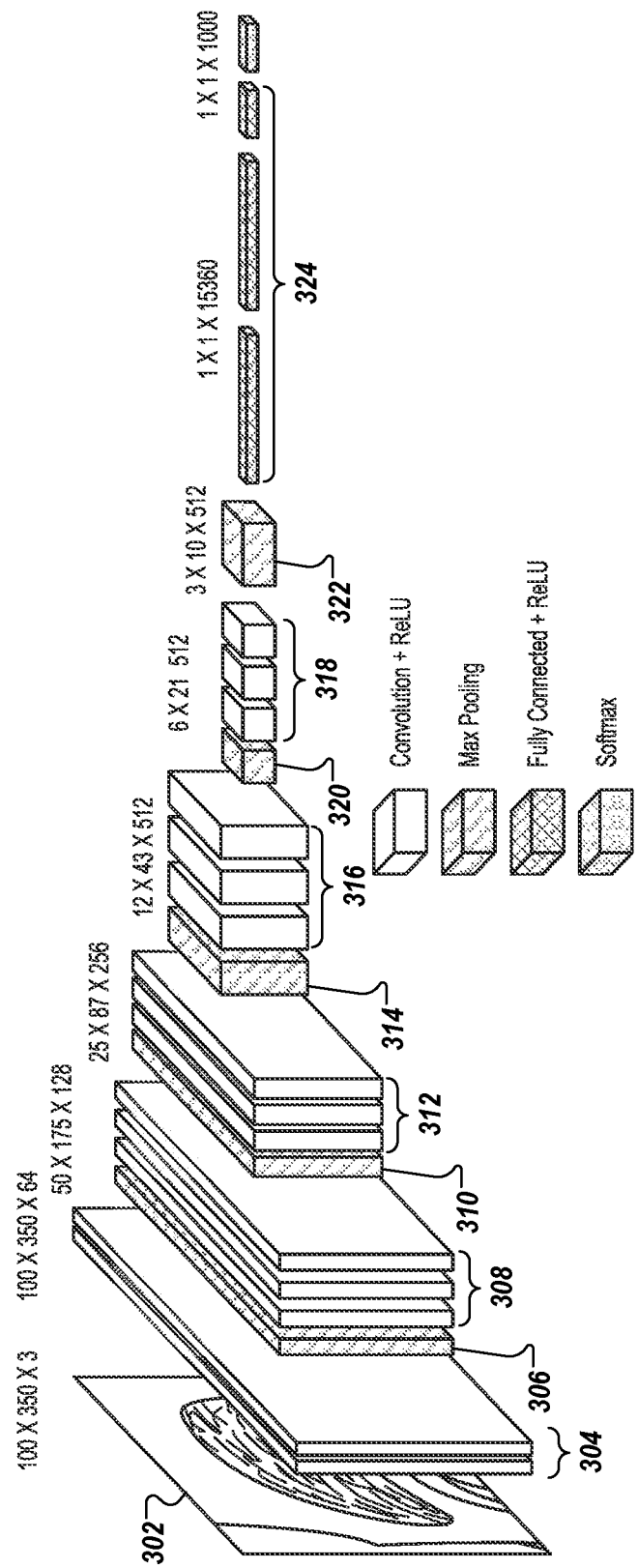
FIG. 3 illustrates an example convolutional neural network for determining eyebrows-based deep features of a user.

FIG. 3 illustrates an example convolutional neural network 300 for determining eyebrows-based deep features of a user. The CNN 300 can be a VGG-16 network with sixteen layers, or some other type of network. The CNN 300 is a type of feed-forward neural network in which a connectivity pattern between neurons is based on the organization of the animal visual cortex. The CNN 300 can be arranged into convolutional layers alternating with subsampling layers.

The CNN 300 includes an input layer 302 of a ROI image of an eyebrow area of a user. The CNN includes two convolutional layers 304, each with sixty four filters. The convolutional layers 304, and other convolutional layers mentioned below, can each include rectified linear units (ReLU), for normalization.

A max-pooling layer 306 can be used for down-sampling. Max-pooling can eliminate non-maximal values, and such elimination can: 1) reduce computation for upper layers; and 2) provide position invariance over larger local regions, which can lead to faster convergence, selection of superior invariant features, and improved generalization.

Down-sampled data can be processed by three convolutional layers 308, each with 128 filters. Another max-pooling layer 310 can be used for further down-sampling. Further convolutional layers 312, each with 256 filters, are used, with yet further down-sampling performed using a max-pooling layer 314. Further convolutions are performed using convolutional layer sets 316 and 318, with further down-sampling performed, in turn, using a max-pooling layer 320 and a last max-pooling layer 322. A feature vector obtained from the last max-pooling layer 322 of size 3×10×512 and flattened to 1×1×15360, as a fully connected layer 324, can be used as a deep feature representation.

Figure 4A:
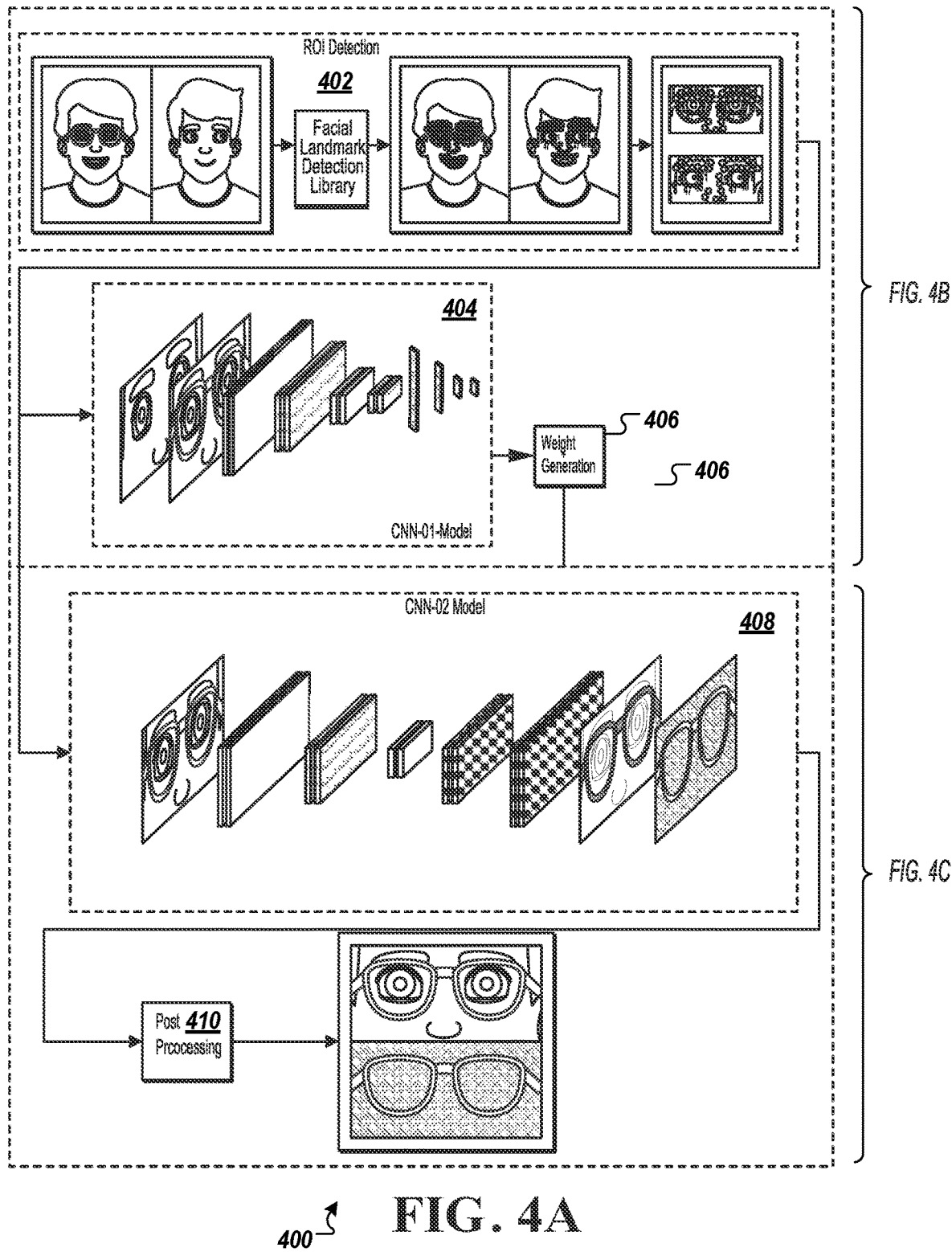
FIGS. 4A-4C illustrate an example of a system for using eyeglasses frames as a soft biometric for short-term authentication.
Figure 4B:
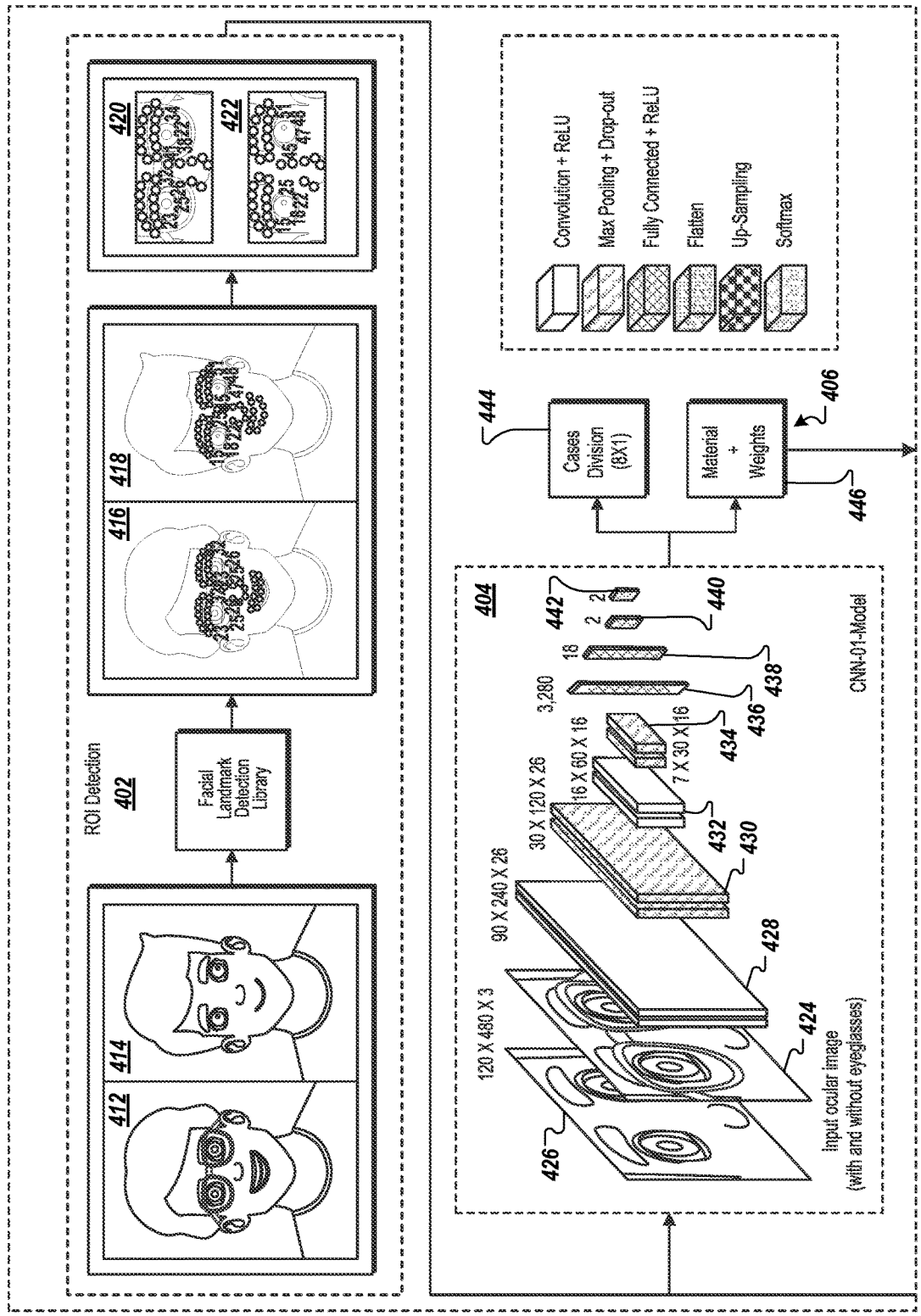
Figure 4C:
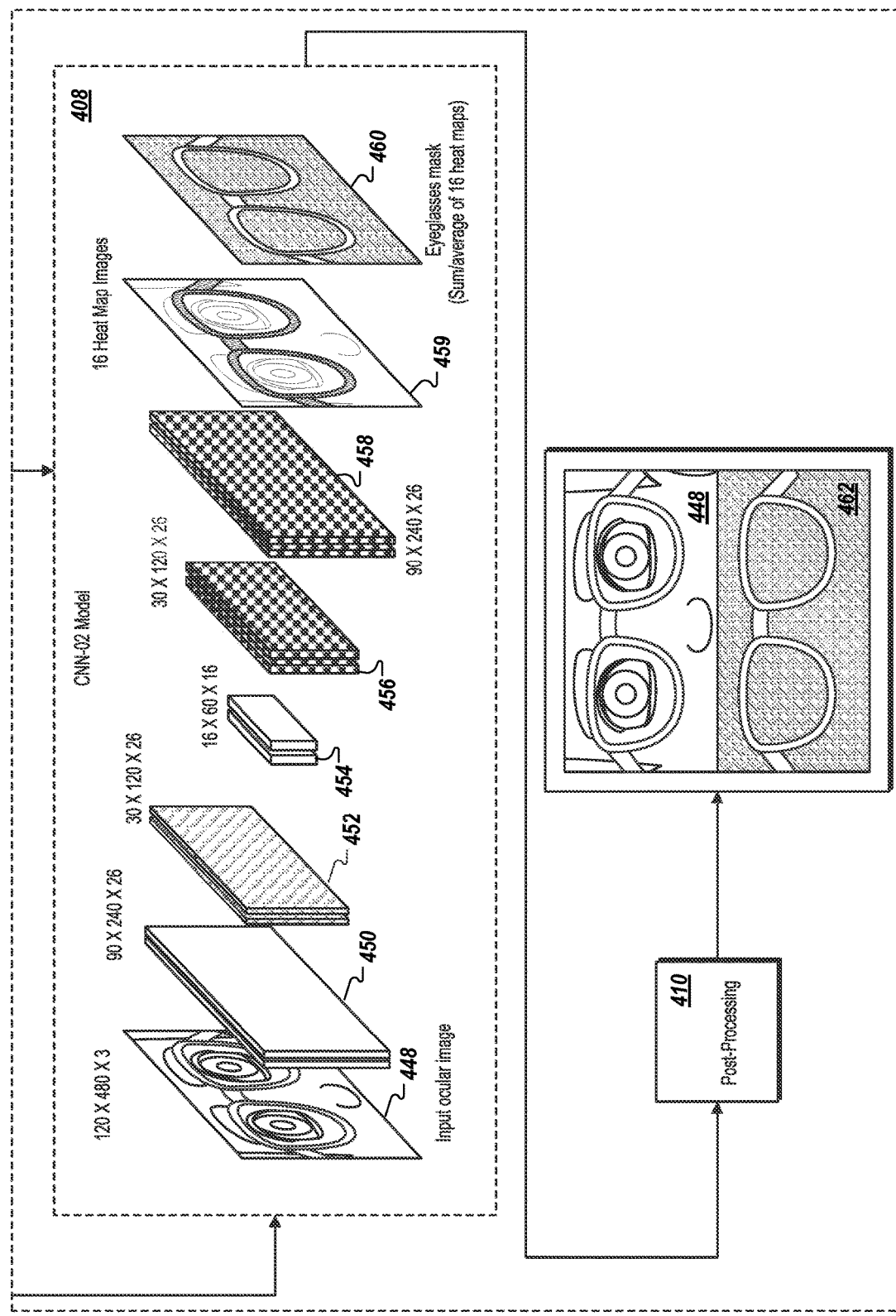

FIGS. 4A-4C illustrate an example of a system 400 for using eyeglasses frames as a soft biometric for short-term authentication. Using eyeglasses frames for short-term authentication can include a ROI detection phase 402 and use of cascaded CNNs. A first CNN 404 can be used for eyeglass frame detection. Weights generated from a weight generation phase 406 can be provided to a second CNN 408, which can be used for image segmentation. The ROI detection phase 402, the first CNN 404, and the weight generation phase 406 are described in more detail below with respect to FIG. 4B. The second CNN 408 and a post-processing phase 410 are described in more detail below with respect to FIG. 4C.

As shown in FIG. 4B, during the ROI detection phase 402, facial landmarks can be identified in input images 412 and 414. The input image 412 is of a user wearing glasses and the input image 414 is of a user who is not wearing glasses. Coordinates of identified landmarks are illustrated in annotated images 416 and 418. ROIs 420 and 422 can be generated by cropping the input image 412 and or the input image 414, respectively, based on identified landmark coordinates.

The first CNN 404 can accept the ROIs 420 and 422 as input (e.g., as illustrated by input layers 424 and 426, respectively). The first CNN 404 includes convolutional layers 428, max-pooling layers 430, further convolutional layers 432, further max-pooling layers 434, flattening layers 436 and 438, a fully-connected layer 440, and a softmax layer 442. Outputs of the first CNN 404 include a cases division 444 and weights 446. The weights 446 represent micro-structure features of large-scale images.

As shown in FIG. 4C, the second CNN 408 includes an input layer 448 of an ocular image, convolutional layers 450, max-pooling layers 452, further convolutional layers 454, up-sampling layers 456 and 458, heat-map images 459 (e.g., sixteen heat-map images), and an eyeglasses mask 460. The eyeglasses mask 460 can be a sum/average of the sixteen heat-map images, for example. Post-processing operations 410 can include summation or averaging (or other mathematical operations) and binarization operations. An eyeglasses mask 462 can be generated based on the post-processing operations 410, with the eyeglasses mask corresponding to the ocular input image 448.

Figure 5A:
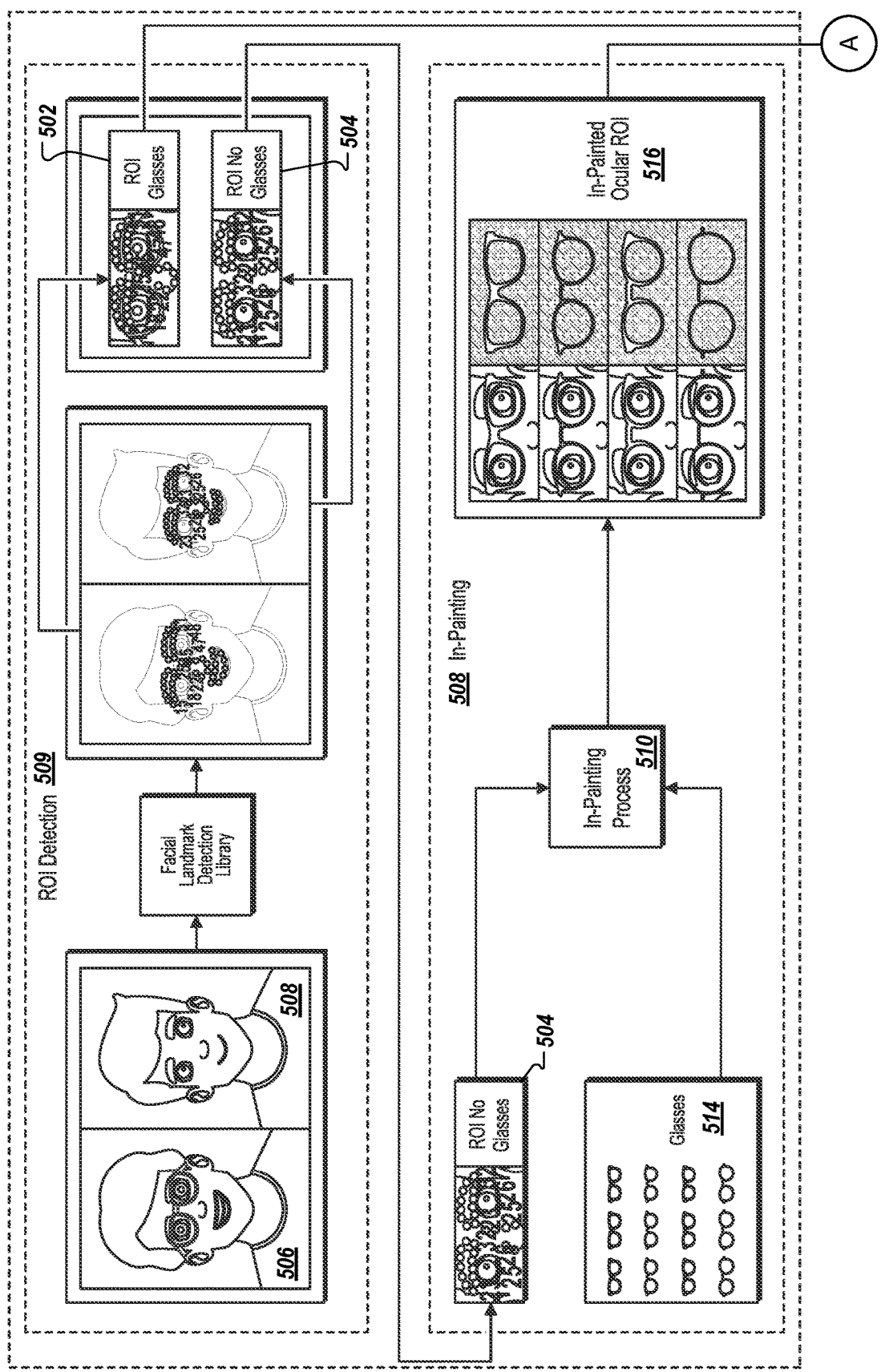
FIGS. 5A-5B illustrate another example of a system for using eyeglasses frames as a soft biometric for short-term authentication.
Figure 5B:
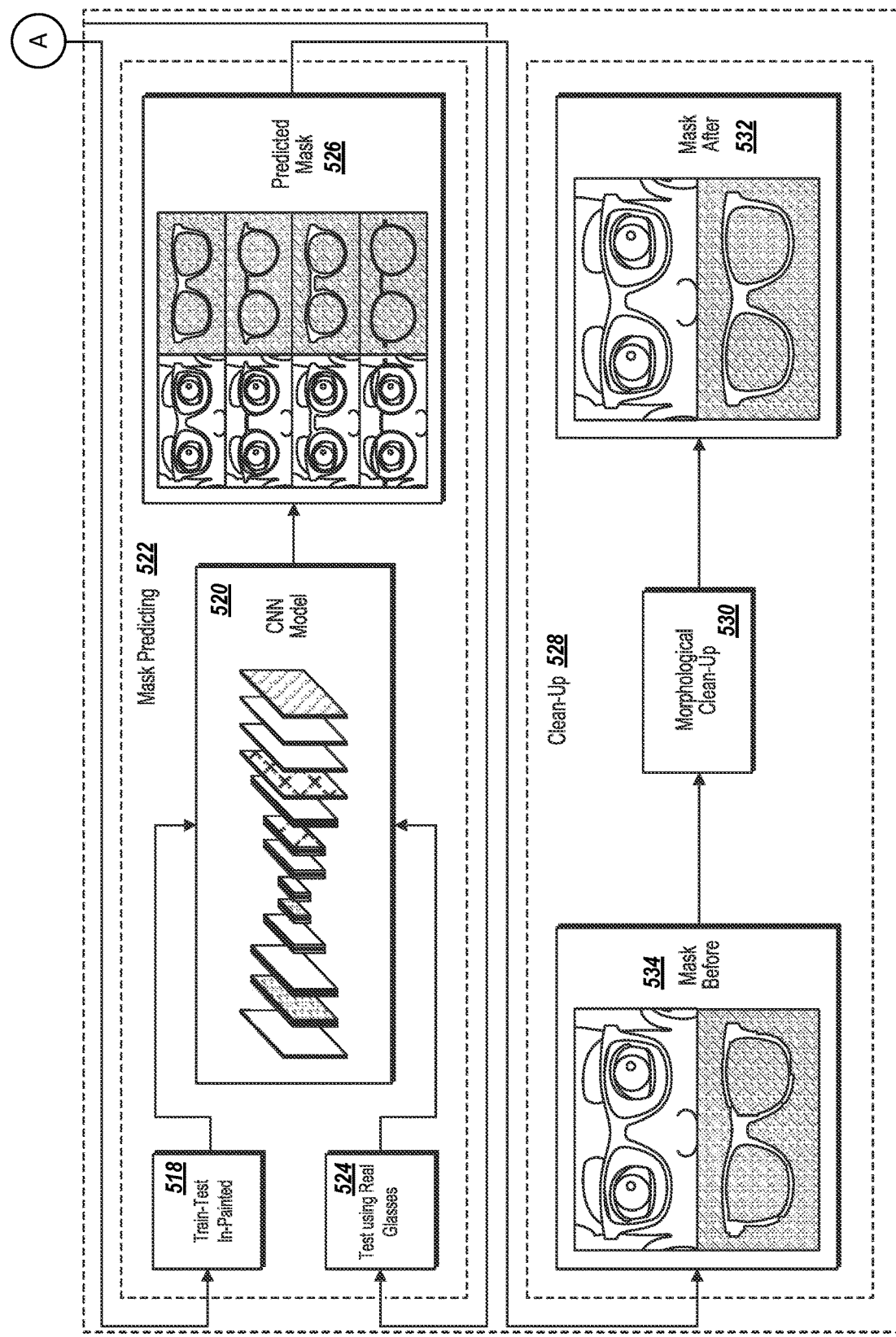

FIGS. 5A-5B illustrate another example of a system 500 for using eyeglasses frames as a soft biometric for short-term authentication. As shown in FIG. 5A, a glasses ROI 502 and a no-glasses ROI 504 can be generated, based on a with-glasses image 506 and a no-glasses image 508, respectively, as described above for the system 400, in a ROI detection phase 509. An in-painting phase 510 can include an in-painting process 512 accepting the no-glasses ROI 504 and glasses images 514 to produce in-painted ocular ROIs 516.

As shown in FIG. 5B, the in-painted ocular ROIs 516 can be used, in a training phase 518, to train a CNN 520, as part of a mask-predicting phase 522. The CNN 520 can be tested, in a testing phase 524, using images of real glasses. The CNN 520 can be used to generate masks 526. In a clean-up phase 528, a morphological clean-up process 530 can be used to create a cleaned-up mask 532 from a CNN mask output 534.

The cleaned-up mask 532 or the mask 462 can be used in an eyeglasses-based user authentication process. For instance, the cleaned-up mask 532 or the mask 462 can be multiplied by RGB (Red, Green, Blue) channels of an original ROI (e.g., extended ocular region) to obtain an eyeglasses frame. Local, global and deep feature descriptors, e.g., HOG, GIST, and VGG-16 descriptors, can be extracted from the segmented eyeglasses. Extracted features can be used for SVM training and classification to authenticate subjects based on their eyeglasses frame shape. In some implementations, users can be authenticated based on both eyebrow and eyeglass frame characteristics.

Figure 6:
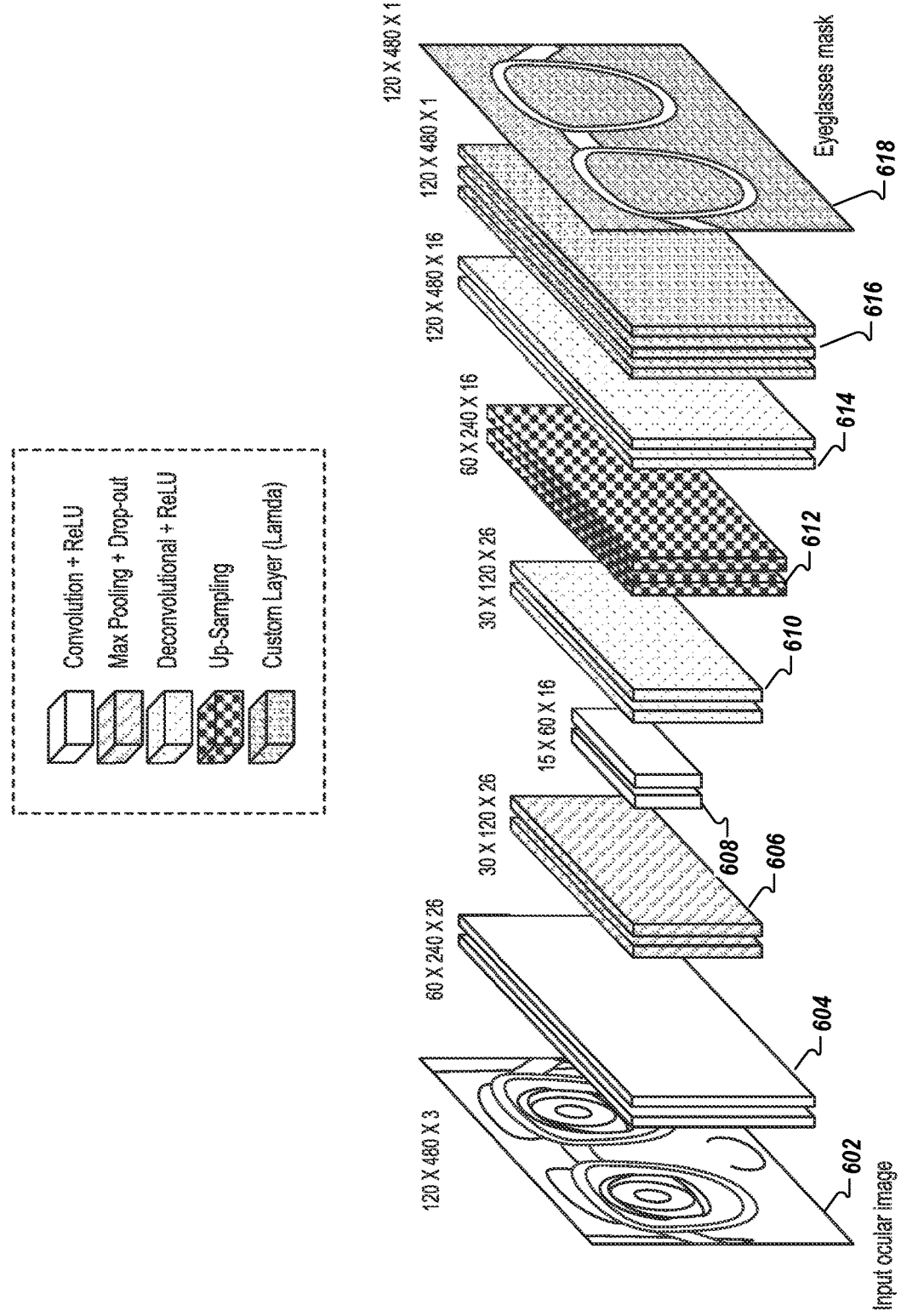
FIG. 6 illustrates an example convolutional neural network for using eyeglasses frames as a soft biometric for short-term authentication.

FIG. 6 illustrates an example convolutional neural network 600 for using eyeglasses frames as a soft biometric for short-term authentication. The CNN 600 can be the CNN 520, for example. The CNN 600 includes an input ocular image 602 (e.g., an image of a user who is wearing glasses). The CNN 600 also includes convolutional layers 604, max-pooling layers 606, further convolutional layers 608, deconvolutional layers 610, up-sampling layers 612, further deconvolutional layers 614, and custom (e.g., Lambda) layers 616. A eyeglasses mask 618 (e.g., the mask 526) can be an output of the CNN 600.

Figure 7:
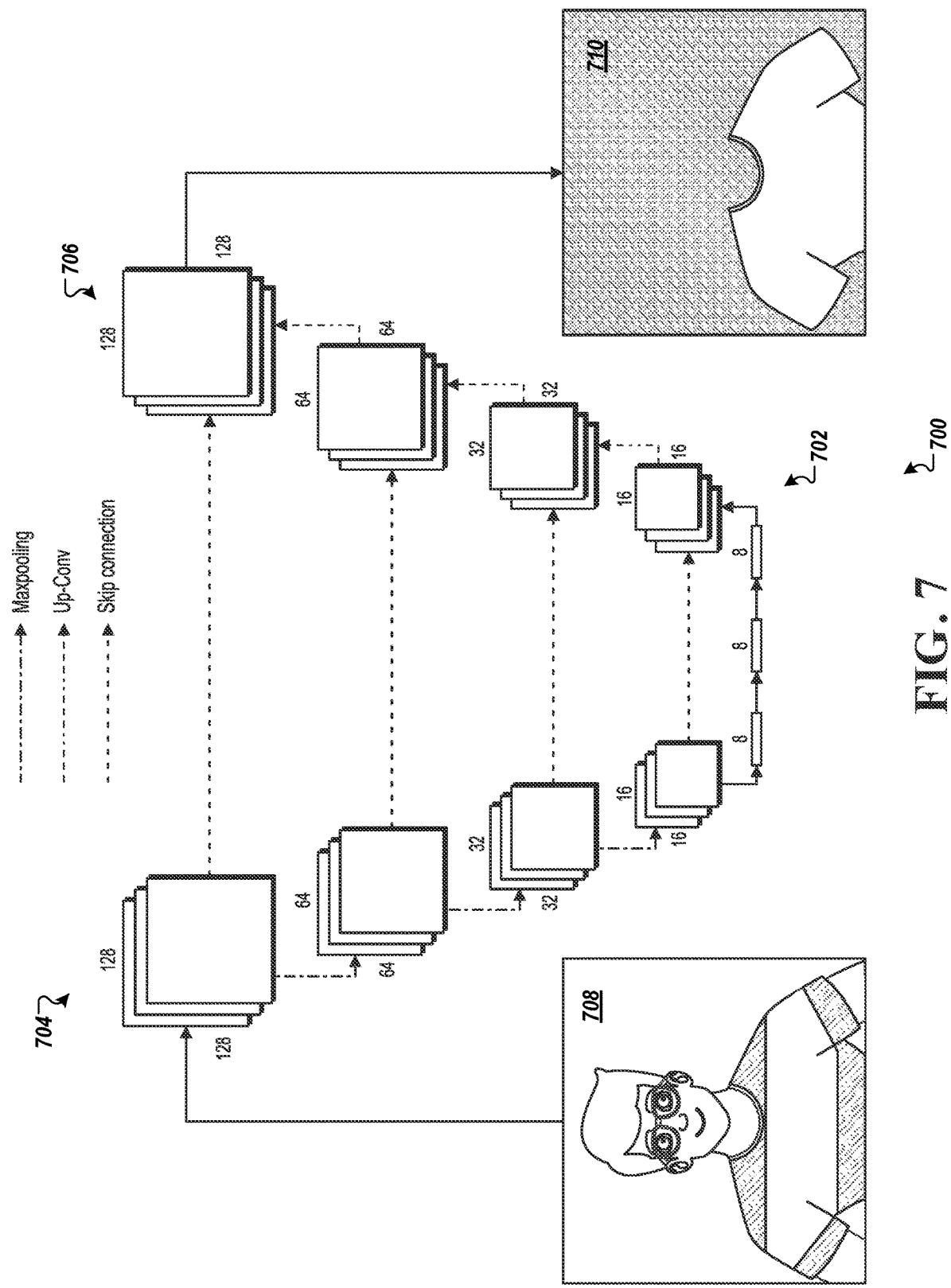
FIG. 7 illustrates an example of a system for using clothing characteristics as a soft biometric for short-term authentication.

FIG. 7 illustrates an example of a system for using clothing characteristics as a soft biometric for short-term authentication. In addition to eyebrow and/or eyeglass frame soft biometrics, clothing characteristics can be used as an auxiliary form of identification, and can be used in combination with one or more other types of identifying information. Using clothing characteristics can include upper-torso-pose clothing ROI segmentation, and robust matching of features extracted from clothing ROIs. Both learning and non-learning methods can be used for clothing feature matching.

In some implementations, a CNN 702 (e.g., U-Net) is used for clothing ROI segmentation. The CNN 702 includes a contracting portion (e.g., an encoder 704) and an expansive path (e.g., a decoder 706). The encoder 704 can include a repeated application of two 3×3 convolutions, followed by rectified linear units (ReLU), and 2×2 max pooling operations. Each decoder layer can include, for example, an up-sampling using 2×2 up-convolution, a concatenation of corresponding feature maps from the contracting path, and two 3× convolutions followed by ReLUs. An output of the CNN 702, given an input upper-torso image 708, is a mask 710.

Figure 8:
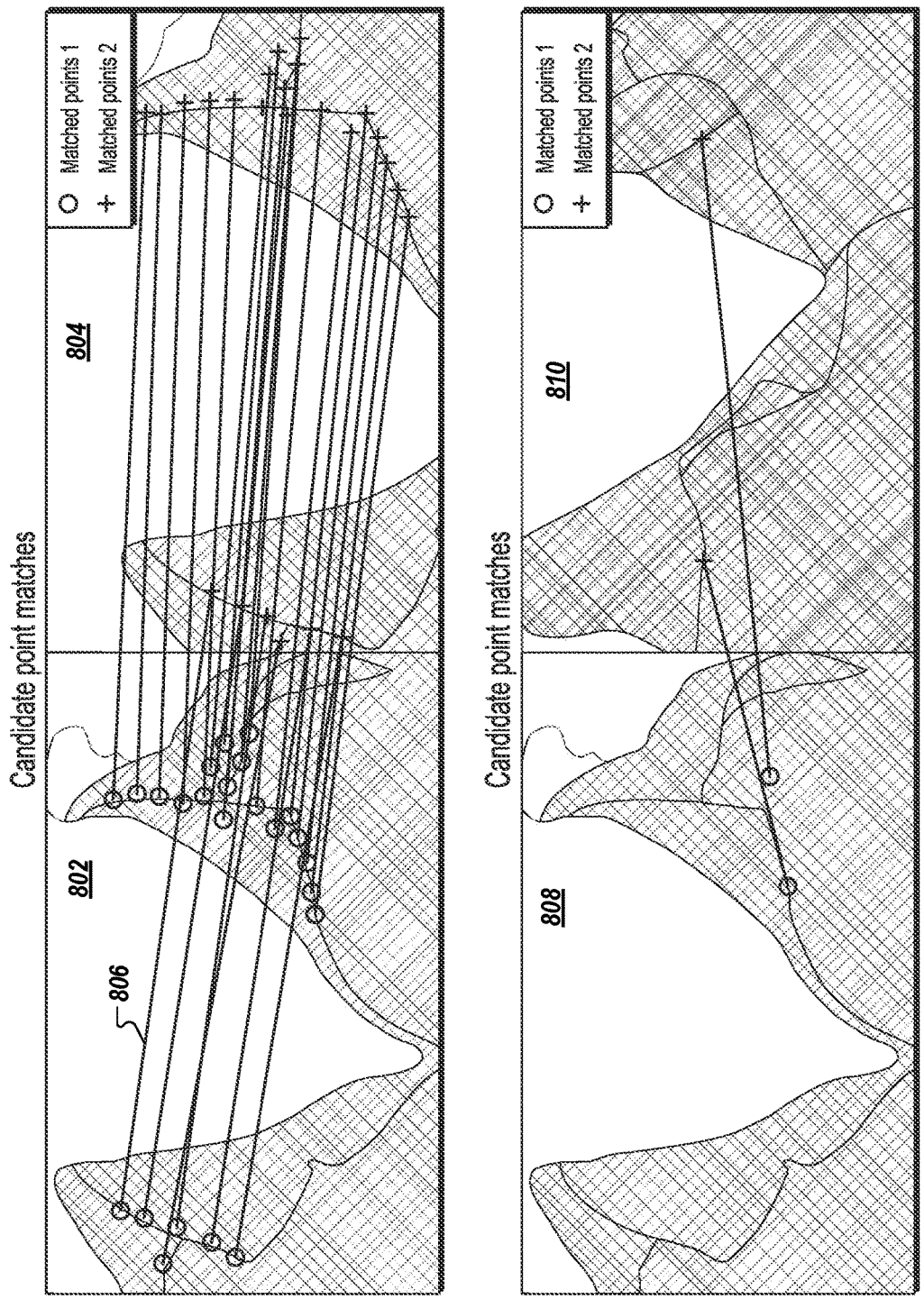
FIG. 8 illustrates using clothing characteristics as a soft biometric for short-term authentication using a non-learning based approach.

FIG. 8 illustrates using clothing characteristics as a soft biometric for short-term authentication using a non-learning based approach. A non-learning based method for clothes matching can include a discriminant that is a predefined distance metric, such as Euclidean or Manhattan distance. In some implementations, a Speeded-Up Robust Features (SURF) approach is used. A SURF approach can be used for local feature detection and descriptor generation. To detect interest points, a SURF approach can use a Hessian matrix with an approximation of Gaussian smoothing. Similar to Scale Invariant Feature Transform (SIFT) approaches, interest points can be calculated at different scales of an image pyramid. Descriptors around each interest point can be computed using first order Haar wavelet responses which represent an intensity distribution of pixels within a block. A match score can be computed as a number of matched SURF points between an initial clothing ROI (e.g., gathered during a primary authentication process) and a verification clothing ROI (e.g., gathered at a later time) using a sum of absolute differences (e.g., Manhattan distance).

For instance, a clothing ROI 802 can be compared to a second clothing ROI 804, e.g., when the second clothing 804 is a region of an image of a same article of clothing as shown in the clothing ROI 802 (e.g., taken at a different point in time). A match score for the comparison of the clothing ROI 802 to the second clothing ROI 804 can be a sum of matching SURF points, e.g., where each matching SURF point pair can be shown as a connected line (e.g., a connection 806). The match score for the comparison of the ROI 802 to the second ROI 804 can be greater than a threshold (e.g., twenty matches), indicating that the second clothing ROI likely corresponds to a user wearing a same article of clothing as recently recorded. Accordingly, an authentication verification process can succeed. As another example, a match score for a comparison of a clothing ROI 808 to a clothing ROI 810 for an imposter article of clothing can be less than the threshold (e.g., the match score can be two, as shown). Accordingly, an authentication verification process can fail.

Figure 9:
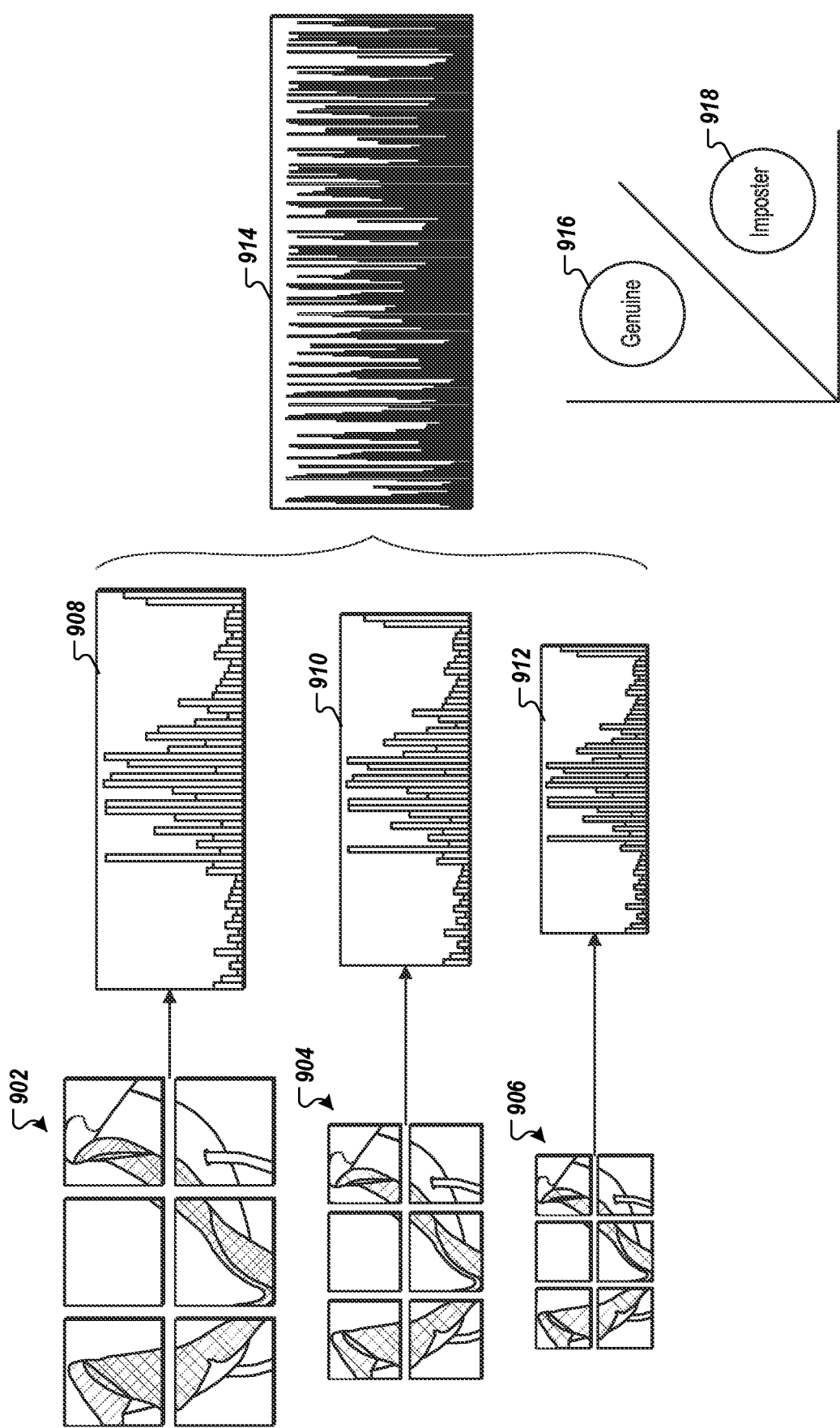
FIG. 9 illustrates using clothing characteristics as a soft biometric for short-term authentication using a learning based approach.

FIG. 9 illustrates using clothing characteristics as a soft biometric for short-term authentication using a learning-based approach. In a learning-based approach, a discriminant (e.g., similarity metric) can be learned using training data. For example, tile texture features can be used to train a SVM as a learned similarity metric. The trained SVM can then be used for authentication verification. In some implementations, a local binary pattern (LBP), histogram of oriented gradient, and color histogram can be used. LBP is a visual descriptor that can encodes the differences between a given center pixel with neighboring pixels. A HOG approach can include computing a local gradient orientation of dense grid with local contrast normalization. LBP and HOG can both operate on gray-scale images. A color histogram approach can generate color information from a histogram of red, green, and blue channels.

Features can be extracted by dividing a clothing ROI into 2×3 non-overlapping tiles at four different image scales (e.g., 1×, 0.5×, and 0.25×). For instance, a clothing ROI has been divided into tiles 902, 904, and 906, at different scales. The LBP, HOG and CH feature vectors can be concatenated into a single vector and used for training and testing SVMs (e.g., a linear SVM). For instance, features 908, 910, and 912 extracted from the tiles 902, 904, and 906, respectively, can be concatenated into a single vector 914.

For clothing-based authentication verification with deep features, a VGG neural network can be used. Deep features can be obtained, for example, from $4^{th}$ and the $5^{th}$ pooling layers of a VGG-16 network. Image features extracted from the $4^{th}$ and $5^{th}$ pooling layers can be aggregated with a fisher vector. An output of clothing-based authentication verification can be a genuine (e.g., same) user 916, or an imposter user 918. Clothing-based authentication verification can be combined with eyebrow and/or eyeglass frame based methods.

Figure 10:
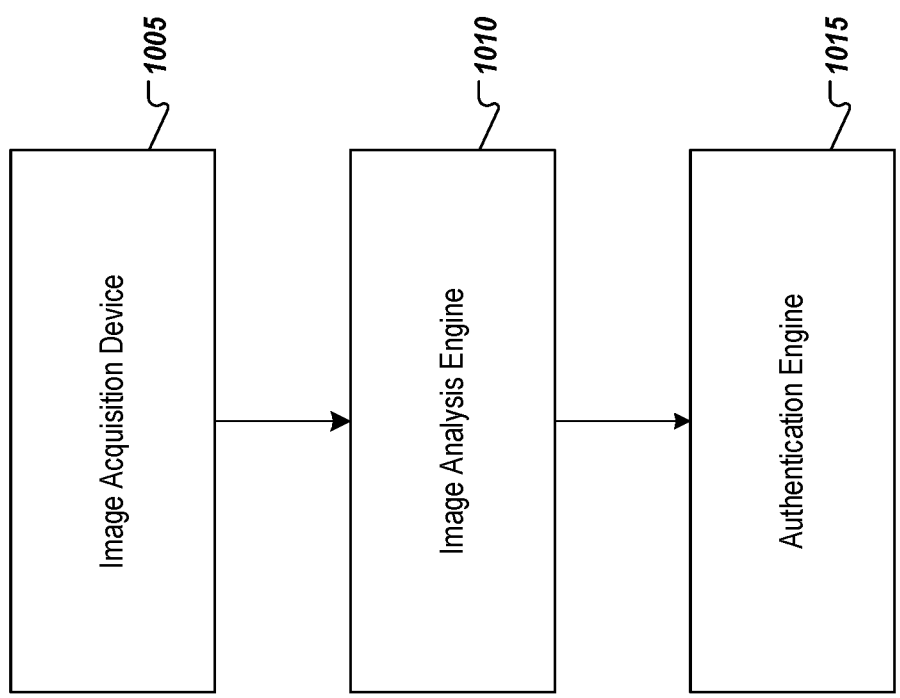
FIG. 10 illustrates an example of a system in which the technology described herein may be used.

FIG. 10 shows an example system 1000 system in which the technology described herein may be used. The system 1000 includes an image acquisition device 1005 configured to capture images of subjects. In some implementations, the image acquisition device 1005 includes an infrared camera. In some implementations, the image acquisition device 1005 includes one or more processing devices configured to generate digital data from the captured images. The image acquisition device 1005 can capture a first image of a user during a primary authentication process and a second image of a user at a later time during an authentication verification process.

The system 1000 also includes an image analysis engine 1010 that can be configured to analyze images captured by the image acquisition device 1005. In some implementations, the image analysis engine 1010 resides on a computing device (e.g., a server) that is at a remote location with respect to the image acquisition device 1005 and/or an authentication engine 1015. For example, the image acquisition device 1005 can be disposed at a kiosk or a mobile device that communicates over a network with a remote server on which the image analysis engine 1010 executes. The image analysis engine 1010 can in turn provide an output of the analysis to the authentication engine 1015 residing on the kiosk or the mobile device. In some implementations, the authentication engine 1015 can also reside on a remote server (e.g., the same server one which the image analysis engine 1010 resides, or on a different server) and communicate the result of an authentication process to the kiosk or the mobile device.

The image analysis engine 1010 can be configured to analyze the captured images in various ways, in order to determine features of the captured images that can be used for user identification. For instance, for both the first image and the second image, the image analysis engine 1010 can identify eyebrow features, eyeglass frame features, and clothing features.

The authentication engine 1015 can be configured to perform both a primary authentication process and an authentication verification process. The primary authentication process can include, e.g., using one or more primary biometric features (e.g., facial, iris) and/or using some other means of user identification (e.g., entered credentials). During the primary authentication process, first auxiliary user identifying information, such as eyebrow features, eyeglass frame features, and clothing features, can be stored for the user.

The authentication verification process can include capturing second auxiliary user identifying information for the subject, including second eyebrow features, second eyeglass frame features, and second clothing features. The authentication engine 1015 can compare the first auxiliary user identifying information to the second auxiliary user identifying information and determine, based on the comparison, a match score that indicates a degree of match between the first auxiliary user identifying information and the second auxiliary user identifying information. In response to determining that the match score meets or exceeds the predetermined threshold score, the authentication engine 1015 can verify an authenticated state for the subject in which continued use of a device is allowed. As another example, in response to determining that the match score does not meet or exceed the predetermined threshold score, the authentication engine 1105 can end the authenticated state for the subject, which can include disabling use of the device by the subject.

Networks described herein can be trained, e.g., using photos obtained from front-facing mobile device cameras or other devices. Other images can be used for network testing. Training and testing images can each include images taken in various types of lighting (e.g., outdoor daylight, office lighting).

Figure 11:
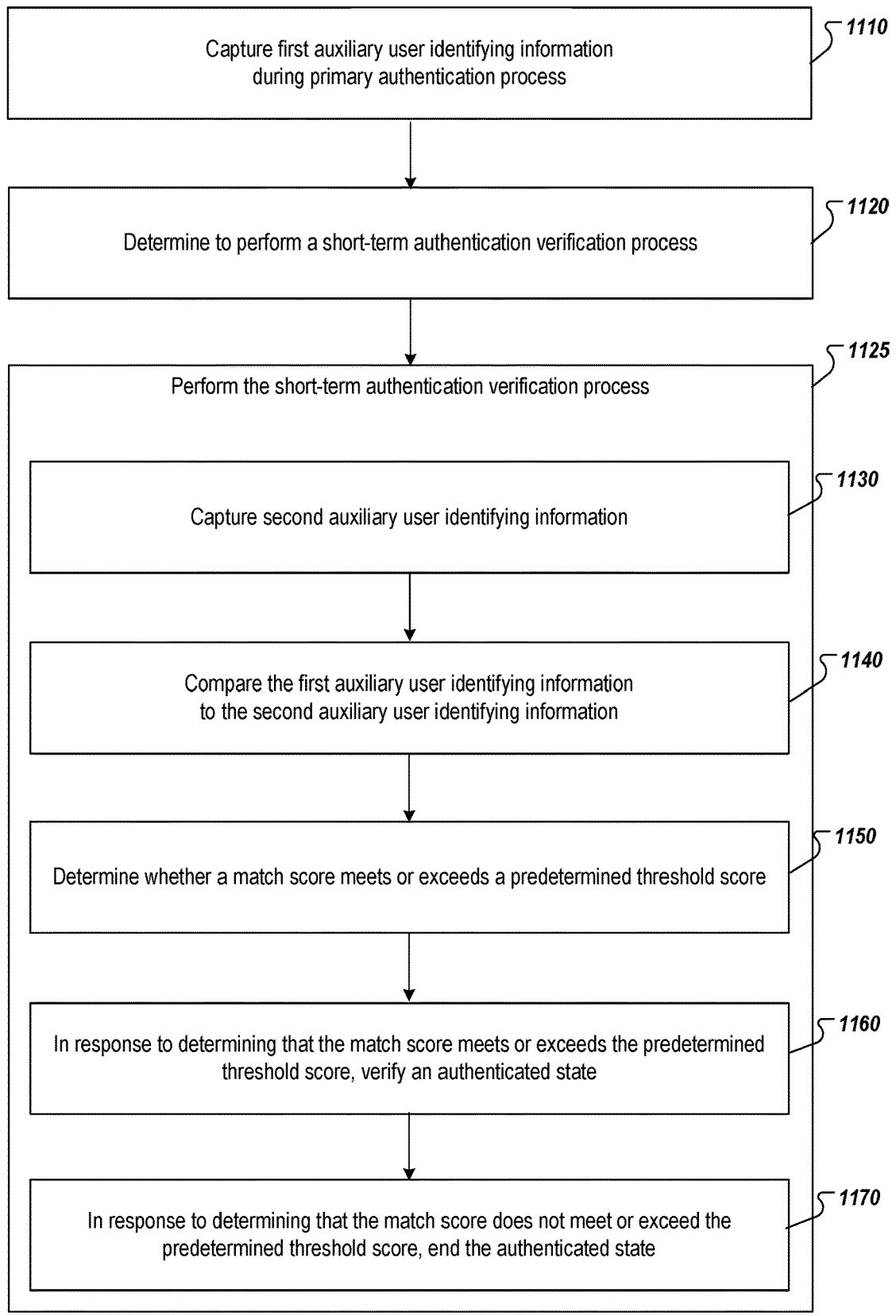
FIG. 11 is a flowchart of an example process for verifying an authenticated state of a device.

FIG. 11 is a flowchart of an example process 1100 for verifying an authenticated state of a device. In some implementations, at least a portion of the process 1100 may be executed by one or more processing devices disposed within a kiosk such as the kiosk 106, or within a mobile device such as the mobile device 103, each described with reference to FIG. 1. In some implementations, at least a portion of the process 1100 may be executed by the authentication engine 1015, which may be disposed within a kiosk, within a mobile device, or at one or more servers.

Operations of the process 1100 include capturing, during a primary authentication process in which primary user identifying information is obtained for a subject using a device, first auxiliary user identifying information for short-term authentication verification of the subject (1110). The first auxiliary user identifying information includes first eyebrow biometric information for the subject and first eyeglass frame information for the subject. The first auxiliary user identifying information can include clothing characteristics. The primary user identifying information can be associated with a primary biometric, such as face or iris characteristics. As another example, the primary user identifying information can be a user identifier. The device can be a mobile device, a kiosk device, or some other type of device. When the device is a mobile device, the first auxiliary user identifying information can be obtained using a front-facing camera of the mobile device. The front-facing camera can capture a user's face and upper torso, for example.

Operations of the process 1100 also include determining, after the primary authentication process, to perform a short-term authentication verification process to verify identify of the subject (1120). For example, a determination can be made that a predetermined amount of time (e.g., two minutes) has occurred since completion of the primary authentication process, and that the short-term authentication verification process should be performed. The short-term authentication verification process can be repeated at multiple subsequent time points (e.g., every two minutes).

Operations of the process 1100 also include performing the short-term authentication verification process (1125). The short-term authentication verification process can be performed automatically, without prompting the subject for user input.

Performing the short-term authentication verification process includes capturing second auxiliary user identifying information for the subject (1130). The second auxiliary user identifying information includes second eyebrow biometric information for the subject and second eyeglass frame information for the subject. The second auxiliary user identifying information can include second clothing characteristics of the subject.

Performing the short-term authentication verification process also includes comparing the first auxiliary user identifying information to the second auxiliary user identifying information (1140), including determining a match score that indicates a degree of match between the first auxiliary user identifying information and the second auxiliary user identifying information. For instance, the first eyebrow biometric information can be compared to the second eyebrow biometric information to create an eyebrow match score. The eyebrow match score can be a fusion of a left eyebrow match score and a right eyebrow match score. The first eyeglass frame information can be compared to the second eyeglass frame information to create an eyeglasses frame match score. The first clothing characteristics can be compared to the second clothing characteristics to create a clothing characteristic match score.

The match score can be a fusion score of two or more of the eyebrow match score, the eyeglasses frame match score, and the clothing characteristic match score. Individual scores can be normalized (e.g., in a min-max manner) before being used in a fusion score. Different type of fusion scores can be used. For instance, a weighted fusion score can be used. A weighted score level (WSL) fusion score can be calculated, for example, using formula (1):

$$WSL = CL*W_{CL} + EB*W_{EB} + GL*W_{GL} \qquad (1)$$

where CL is a clothing-based score, $W_{CL}$ is a clothing-based weight, EB is an eyebrow-based score, $W_{EB}$ is an eyebrow-based weight, GL is an eyeglasses-based score, and $W_{GL}$ is an eyeglasses-based weight. Respective weights can be determined based on maximum obtained accuracy.

Performing the short-term authentication verification process also includes determining whether the match score meets or exceeds a predetermined threshold score (1150). The predetermined threshold score can correspond to a predetermined likelihood (e.g., 98%).

Performing the short-term authentication verification process also includes, in response to determining that the match score meets or exceeds the predetermined threshold score, verifying an authenticated state for the subject in which continued use of the device is allowed (1160).

Performing the short-term authentication verification process also includes, in response to determining that the match score does not meet or exceed the predetermined threshold score, ending the authenticated state for the subject, including disabling use of the device by the subject (1170). In some implementations, in response to determining that the match score does not meet or exceed the predetermined threshold score, the primary authentication process is re-performed (e.g., to request that a user re-log in or re-provide primary biometric data).

Figure 12:
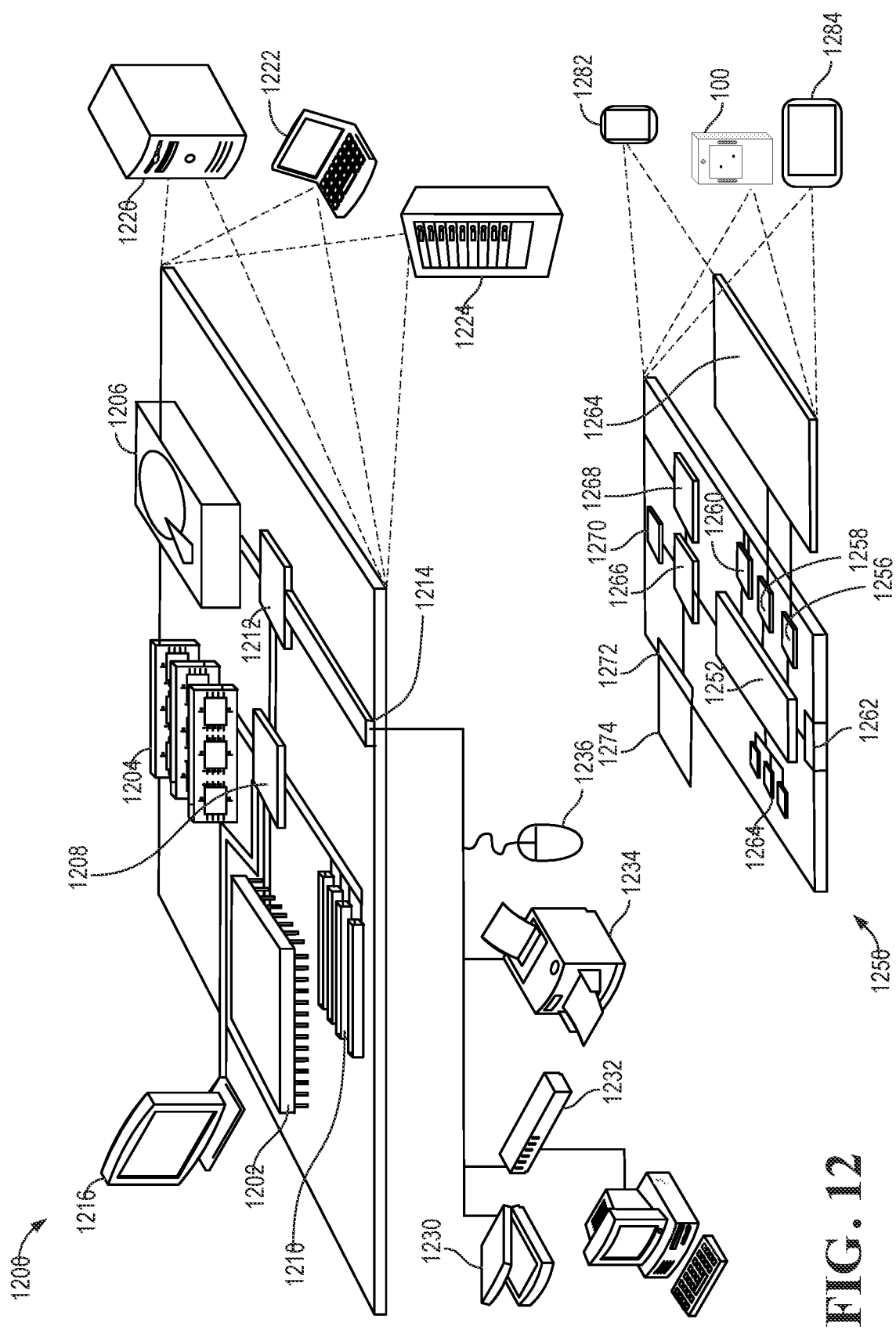
FIG. 12 is a block diagram representing examples of computing devices.

FIG. 12 shows an example of a computing device 1200 and a mobile device 1250, which may be used with the techniques described here. For example, referring to FIG. 1, the kiosk device 106 can include one or more of the computing device 1200 or the mobile device 1250, either in part or in its entirety. The mobile device 106 can be the mobile device 1250, for example. Computing device 1200 is intended to represent various forms of digital computers, such as laptops, desktops, workstations, personal digital assistants, servers, blade servers, mainframes, and other appropriate computers. Computing device 1250 is intended to represent various forms of mobile devices, such as personal digital assistants, cellular telephones, smartphones, and other similar computing devices. The components shown here, their connections and relationships, and their functions, are meant to be examples only, and are not meant to limit implementations of the techniques described and/or claimed in this document.

Computing device 1200 includes a processor 1202, memory 1204, a storage device 1206, a high-speed interface 1208 connecting to memory 1204 and high-speed expansion ports 1210, and a low speed interface 1212 connecting to low speed bus 1214 and storage device 1206. Each of the components 1202, 1204, 1206, 1208, 1210, and 1212, are interconnected using various busses, and may be mounted on a common motherboard or in other manners as appropriate. The processor 1202 can process instructions for execution within the computing device 1200, including instructions stored in the memory 1204 or on the storage device 1206 to display graphical information for a GUI on an external input/output device, such as display 1216 coupled to high speed interface 1208. In other implementations, multiple processors and/or multiple buses may be used, as appropriate, along with multiple memories and types of memory. Also, multiple computing devices 1200 may be connected, with each device providing portions of the necessary operations (e.g., as a server bank, a group of blade servers, or a multi-processor system).

The memory 1204 stores information within the computing device 1200. In one implementation, the memory 1204 is a volatile memory unit or units. In another implementation, the memory 1204 is a non-volatile memory unit or units. The memory 1204 may also be another form of computer-readable medium, such as a magnetic or optical disk.

The storage device 1206 is capable of providing mass storage for the computing device 1200. In one implementation, the storage device 1206 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1204, the storage device 1206, memory on processor 1202, or a propagated signal.

The high speed controller 1208 manages bandwidth-intensive operations for the computing device 1200, while the low speed controller 1212 manages lower bandwidth-intensive operations. Such allocation of functions is an example only. In one implementation, the high-speed controller 1208 is coupled to memory 1204, display 1216 (e.g., through a graphics processor or accelerator), and to high-speed expansion ports 1210, which may accept various expansion cards (not shown). In the implementation, low-speed controller 1212 is coupled to storage device 1206 and low-speed expansion port 1214. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1200 may be implemented in a number of different forms, as shown in the figure. For example, it may be implemented as a standard server 1220, or multiple times in a group of such servers. It may also be implemented as part of a rack server system 1224. In addition, it may be implemented in a personal computer such as a laptop computer 1222. Alternatively, components from computing device 1200 may be combined with other components in a mobile device (not shown), such as device 1250. Each of such devices may contain one or more of computing device 1200, 1250, and an entire system may be made up of multiple computing devices 1200, 1250 communicating with each other.

Computing device 1250 includes a processor 1252, memory 1264, an input/output device such as a display 1254, a communication interface 1266, and a transceiver 1268, among other components. The device 1250 may also be provided with a storage device, such as a microdrive or other device, to provide additional storage. Each of the components 1250, 1252, 1264, 1254, 1266, and 1268, are interconnected using various buses, and several of the components may be mounted on a common motherboard or in other manners as appropriate.

The processor 1252 can execute instructions within the computing device 1250, including instructions stored in the memory 1264. The processor may be implemented as a chipset of chips that include separate and multiple analog and digital processors. The processor may provide, for example, for coordination of the other components of the device 1250, such as control of user interfaces, applications run by device 1250, and wireless communication by device 1250.

Processor 1252 may communicate with a user through control interface 1258 and display interface 1256 coupled to a display 1254. The display 1254 may be, for example, a TFT LCD (Thin-Film-Transistor Liquid Crystal Display) or an OLED (Organic Light Emitting Diode) display, or other appropriate display technology. The display interface 1256 may comprise appropriate circuitry for driving the display 1254 to present graphical and other information to a user. The control interface 1258 may receive commands from a user and convert them for submission to the processor 1252. In addition, an external interface 1262 may be provide in communication with processor 1252, so as to enable near area communication of device 1250 with other devices. External interface 1262 may provide, for example, for wired communication in some implementations, or for wireless communication in other implementations, and multiple interfaces may also be used.

The memory 1264 stores information within the computing device 1250. The memory 1264 can be implemented as one or more of a computer-readable medium or media, a volatile memory unit or units, or a non-volatile memory unit or units. Expansion memory 1274 may also be provided and connected to device 1250 through expansion interface 1272, which may include, for example, a SIMM (Single In Line Memory Module) card interface. Such expansion memory 1274 may provide extra storage space for device 1250, or may also store applications or other information for device 1250. Specifically, expansion memory 1274 may include instructions to carry out or supplement the processes described above, and may include secure information also. Thus, for example, expansion memory 1274 may be provide as a security module for device 1250, and may be programmed with instructions that permit secure use of device 1250. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1264, expansion memory 1274, memory on processor 1252, or a propagated signal that may be received, for example, over transceiver 1268 or external interface 1262.

Device 1250 may communicate wirelessly through communication interface 1266, which may include digital signal processing circuitry where necessary. Communication interface 1266 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1268. In addition, short-range communication may occur, such as using a Bluetooth, WiFi, or other such transceiver (not shown). In addition, GPS (Global Positioning System) receiver module 1270 may provide additional navigation- and location-related wireless data to device 1250, which may be used as appropriate by applications running on device 1250.

Device 1250 may also communicate audibly using audio codec 1260, which may receive spoken information from a user and convert it to usable digital information. Audio codec 1260 may likewise generate audible sound for a user, such as through a speaker, e.g., in a handset of device 1250. Such sound may include sound from voice telephone calls, may include recorded sound (e.g., voice messages, music files, and so forth) and may also include sound generated by applications operating on device 1250.

The computing device 1250 may be implemented in a number of different forms, as shown in the figure. For example, it may be implemented as a cellular telephone 1280. It may also be implemented as part of a smartphone 1282, personal digital assistant, tablet computer, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well. For example, feedback provided to the user can be any form of sensory feedback (e.g., visual feedback, auditory feedback, or tactile feedback). Input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications may be made without departing from the scope of the inventive concepts described herein, and, accordingly, other implementations are within the scope of the following claims.

What is claimed is:

1. A method for verifying an authenticated state of a device, the method comprising:
   capturing, during a primary authentication process in which primary user identifying information is obtained for a subject using the device, first auxiliary user identifying information for short-term authentication verification of the subject, wherein the first auxiliary user identifying information comprises first eyebrow biometric information for the subject and first eyeglass frame information for the subject;
   determining, after the primary authentication process, to perform a short-term authentication verification process to verify identify of the subject; and
   performing the short-term authentication verification process, including:
      capturing second auxiliary user identifying information for the subject, including second eyebrow biometric information for the subject and second eyeglass frame information for the subject;
      comparing the first auxiliary user identifying information to the second auxiliary user identifying information including determining a match score that indicates a degree of match between the first auxiliary user identifying information and the second auxiliary user identifying information;
      determining whether the match score meets or exceeds a predetermined threshold score;
      in response to determining that the match score meets or exceeds the predetermined threshold score, verifying the authenticated state for the subject in which continued use of the device is allowed; and
      in response to determining that the match score does not meet or exceed the predetermined threshold score, ending the authenticated state for the subject including disabling use of the device by the subject.

2. The method of claim 1, further comprising, in response to determining that the match score does not meet or exceed the predetermined threshold score, re-performing the primary authentication process.

3. The method of claim 1, wherein determining to perform the short-term authentication verification process comprises determining that a predetermined amount of time has occurred since completion of the primary authentication process.

4. The method of claim 3, further comprising repeating the short-term authentication verification process at multiple subsequent time points.

5. The method of claim 1, wherein the device is a kiosk device.

6. The method of claim 1, wherein the device is a mobile device.

7. The method of claim 6, wherein the first auxiliary user identifying information and the second auxiliary user identifying information are obtained using a front-facing camera of the mobile device.

8. The method of claim 7, wherein the first auxiliary user identifying information includes first clothing characteristics of the subject, the second auxiliary user identifying information includes second clothing characteristics of the subject, and comparing the first auxiliary user identifying information to the second auxiliary user identifying information includes comparing the first clothing characteristics to the second clothing characteristics.

9. The method of claim 8, wherein the match score comprises a fusion score of two or more of an eyebrow match score, an eyeglasses frame match score, and a clothing characteristic match score.

10. The method of claim 1, wherein the short-term authentication verification process is performed without prompting the subject for user input.

11. A system comprising:
   an image acquisition device configured to capture an image of a subject; and
   an image analysis engine comprising one or more processing devices, the image analysis engine configured to:
      capture, during a primary authentication process in which primary user identifying information is obtained for the subject using a device, first auxiliary user identifying information for short-term authentication verification of the subject, wherein the first auxiliary user identifying information comprises first eyebrow biometric information for the subject and first eyeglass frame information for the subject;
      determine, after the primary authentication process, to perform a short-term authentication verification process to verify identify of the subject; and
      perform the short-term authentication verification process, including:
         capturing second auxiliary user identifying information for the subject, including second eyebrow biometric information for the subject and second eyeglass frame information for the subject;
         comparing the first auxiliary user identifying information to the second auxiliary user identifying information including determining a match score that indicates a degree of match between the first auxiliary user identifying information and the second auxiliary user identifying information;
determining whether the match score meets or exceeds a predetermined threshold score;
in response to determining that the match score meets or exceeds the predetermined threshold score, verifying an authenticated state for the subject in which continued use of the device is allowed; and
in response to determining that the match score does not meet or exceed the predetermined threshold score, end the authenticated state for the subject including disabling use of the device by the subject.

12. The system of claim 11, wherein performing the short-term authentication verification process further comprises, in response to determining that the match score does not meet or exceed the predetermined threshold score, re-performing the primary authentication process.

13. The system of claim 11, wherein determining to perform the short-term authentication verification process comprises determining that a predetermined amount of time has occurred since completion of the primary authentication process.

14. The system of claim 13, wherein the image analysis engine is configured to repeat the short-term authentication verification process at multiple subsequent time points.

15. The system of claim 11, wherein the first auxiliary user identifying information includes first clothing characteristics of the subject, the second auxiliary user identifying information includes second clothing characteristics of the subject, and comparing the first auxiliary user identifying information to the second auxiliary user identifying information includes comparing the first clothing characteristics to the second clothing characteristics.

16. One or more non-transitory machine-readable storage devices comprising machine-readable instructions configured to cause one or more processing devices to execute operations comprising:
capturing, during a primary authentication process in which primary user identifying information is obtained for a subject using a device, first auxiliary user identifying information for short-term authentication verification of the subject, wherein the first auxiliary user identifying information comprises first eyebrow biometric information for the subject and first eyeglass frame information for the subject;
determining, after the primary authentication process, to perform a short-term authentication verification process to verify identify of the subject; and
performing the short-term authentication verification process, including:
capturing second auxiliary user identifying information for the subject, including second eyebrow biometric information for the subject and second eyeglass frame information for the subject;
comparing the first auxiliary user identifying information to the second auxiliary user identifying information including determining a match score that indicates a degree of match between the first auxiliary user identifying information and the second auxiliary user identifying information;
determining whether the match score meets or exceeds a predetermined threshold score;
in response to determining that the match score meets or exceeds the predetermined threshold score, verifying an authenticated state for the subject in which continued use of the device is allowed; and
in response to determining that the match score does not meet or exceed the predetermined threshold score, ending the authenticated state for the subject including disabling use of the device by the subject.

17. The non-transitory machine-readable storage devices of claim 16, the operations further comprising, in response to determining that the match score does not meet or exceed the predetermined threshold score, re-performing the primary authentication process.

18. The non-transitory machine-readable storage devices of claim 16, wherein determining to perform the short-term authentication verification process comprises determining that a predetermined amount of time has occurred since completion of the primary authentication process.

19. The non-transitory machine-readable storage devices of claim 18, wherein the operations comprising repeating the short-term authentication verification process at multiple subsequent time points.

20. The non-transitory machine-readable storage devices of claim 16, wherein the first auxiliary user identifying information includes first clothing characteristics of the subject, the second auxiliary user identifying information includes second clothing characteristics of the subject, and comparing the first auxiliary user identifying information to the second auxiliary user identifying information includes comparing the first clothing characteristics to the second clothing characteristics.

* * * * *